(12) United States Patent
Gilles

(10) Patent No.: US 10,899,408 B2
(45) Date of Patent: Jan. 26, 2021

(54) METHOD AND APPARATUS TO REDUCE THE PROBABILITY OF VEHICLE COLLISION

(71) Applicant: Luxonis LLC, Westminster, CO (US)

(72) Inventor: Brandon Lee Gilles, Westminster, CO (US)

(73) Assignee: Luxonis LLC, Westminster, CO (US)

( * ) Notice: Subject to any disclaimer, the term of this patent is extended or adjusted under 35 U.S.C. 154(b) by 0 days.

(21) Appl. No.: 16/739,280

(22) Filed: Jan. 10, 2020

(65) Prior Publication Data

US 2020/0223506 A1 Jul. 16, 2020

Related U.S. Application Data

(60) Provisional application No. 62/790,989, filed on Jan. 10, 2019.

(51) Int. Cl.
| | |
|---|---|
| *B62J 33/00* | (2006.01) |
| *G06T 7/70* | (2017.01) |
| *G06T 7/55* | (2017.01) |
| *B62J 45/414* | (2020.01) |

(52) U.S. Cl.
CPC .............. *B62J 33/00* (2013.01); *B62J 45/414* (2020.02); *G06T 7/55* (2017.01); *G06T 7/70* (2017.01); *G06T 2207/10024* (2013.01); *G06T 2207/30241* (2013.01); *G06T 2207/30252* (2013.01); *G06T 2210/12* (2013.01)

(58) Field of Classification Search
CPC ... B62J 33/00; B62J 45/414; B62J 6/26; B62J 3/10; B62J 50/22; B62J 27/00; B62J 45/20; G06T 7/70; G06T 7/55; G06T 2207/10024; G06T 2207/30252; G06T 2207/30241; G06T 2210/12

USPC ........................................................ 340/438
See application file for complete search history.

(56) References Cited

U.S. PATENT DOCUMENTS

| | | | |
|---|---|---|---|
| 10,393,872 B2 | 8/2019 | Brisimitzakis et al. | |
| 10,580,158 B1* | 3/2020 | Mousavian | G06K 9/00201 |
| 2015/0228066 A1* | 8/2015 | Farb | H04N 5/232941 |
| | | | 348/148 |
| 2016/0200274 A1* | 7/2016 | Kolatschek | B60R 21/0134 |
| | | | 701/45 |
| 2017/0308760 A1* | 10/2017 | Kwon | G08G 1/16 |

(Continued)

OTHER PUBLICATIONS

Toll (2019) "Damon Motorcycles is making electric motorcycles safer and more comfortable," Electrek, 7 pp. [Retrieved from: https://electrek.co/2019/12/03/damon-motorcycles-is-making-electric-motorcycles-safer-and-more-comfortable/amp/].

*Primary Examiner* — Ojiako K Nwugo
(74) *Attorney, Agent, or Firm* — Lathrop GPM LLP

(57) ABSTRACT

The present invention relates to a method and apparatus employing techniques of computer vision and deep neural networks to provide audible and visual warning indications to vehicle drivers and bicycle riders to reduce the probability of a collision between the vehicle and the bicycle to which it is mounted, particularly in the case of distracted driving. The present invention amounts to an additional set of eyes that is ever-alert and dedicated to watching for impending collisions from behind or from directions not in the operator's primary field of view. When such a potential collision is detected, the present invention provides audible and visual alerts to gain the attention of drivers and riders to reduce the possibility of collision.

18 Claims, 6 Drawing Sheets

(56) References Cited

U.S. PATENT DOCUMENTS

2018/0001952 A1\* 1/2018 Rajamani .................... B62J 3/00
2018/0257684 A1\* 9/2018 Fischer ................. B61L 23/041
2019/0138029 A1\* 5/2019 Ryll ....................... G05D 1/101

\* cited by examiner

METHOD AND APPARATUS TO REDUCE THE PROBABILITY OF VEHICLE COLLISION

CROSS-REFERENCES TO RELATED APPLICATIONS

The present application claims the benefit of U.S. Provisional Application Ser. No. 62/790,989, filed on Jan. 10, 2019 which is incorporated herein by reference in its entirety.

TECHNICAL FIELD

The present invention relates to a method and apparatus to provide enhanced user awareness of nearby vehicles as well as audible and visual warning indications to vehicle operators to reduce the probability of a collision.

BACKGROUND

Safety is a primary concern for a rider of a bicycle, especially in locations where they are sharing the road with larger and/or faster vehicles with four or more wheels. Throughout the description, the term bicycle should be understood to represent any generally two-wheeled vehicle and may be used interchangeably with moped, scooter, motorcycle, tricycle, electric bicycle, or any vehicle that operates at a slower speed than motorized vehicles with two or more axles.

Many safety devices, such as lights and horns, serve to increase visibility of the rider, but not in a dynamic way that is responsive to present dangers involving a vehicle on a collision course with the rider. Other devices allow dynamic activation of lights based on a correlation between physical location of the rider (provided by GPS) and the probability of danger expected in that location. Neither of these solutions provide real-time feedback based on vehicle movement near the rider.

What is needed is a system to automatically detect an imminent, real-time collision danger between a rider and a vehicle. This system may provide a warning designed to grab the attention of the driver of the vehicle and/or the rider so as to avert an impending collision. Such a system is needed because often, a rider is hit by a vehicle that approaches from behind the rider who may be unaware of the approach prior to impact.

SUMMARY

In a first aspect, a method and apparatus reduces the probability of a collision between a two-wheeled vehicle to which it is mounted and surrounding vehicles, particularly in the case of distracted driving. The method and apparatus employ techniques of computer vision and deep neural networks to provide audible and visual warning indications of an impending collision between two-wheeled vehicles that approach from behind or from directions not in the operator's primary field of view.

In a further aspect, a method and apparatus are capable of seeing and identifying vehicles of interest that may potentially be involved in such a collision. The method and apparatus may determine the trajectory of said objects. A further feature includes a visual alert to involved vehicle operators of the detected likelihood of collision by means of high-intensity lights. A further feature includes an audible alert to involved vehicle operators of the detected likelihood of collision by means of a loud horn. The method and apparatus may further include a remote display to the operator for further situational awareness, an audio and video record of the most recent moments are saved for later review and/or operating safety lights.

DETAILED DESCRIPTION OF THE INVENTION

In an embodiment, a method and apparatus for increasing safety for riders of bicycles and other two-wheeled means of transportation is described. Throughout the description, the term bicycle should be understood to represent any generally two-wheeled vehicle and may be used interchangeably with moped, scooter, motorcycle, electric bicycle, or any vehicle that operates at a slower speed than motorized vehicles with two or more axles. The term vehicle will represent a motorized vehicle having two or more axles and operated by a driver. In embodiments, the method and apparatus may also be used on a bicycle to detect a possibility of collision with other bicycles or non-motorized vehicles, or on a vehicle to detect a possibility of collision with either bicycles or other vehicles.

A safety device detects vehicles in the vicinity of the bicycle and determines their relative trajectory to predict the likelihood they may collide with the bicycle to which the apparatus is affixed. When the likelihood and timing of a collision is determined to meet a threshold, the vehicle operator and the bicycle rider are alerted so as to assist in drawing attention to the situation, thereby reducing the possibility that a collision occurs.

Figure 1:
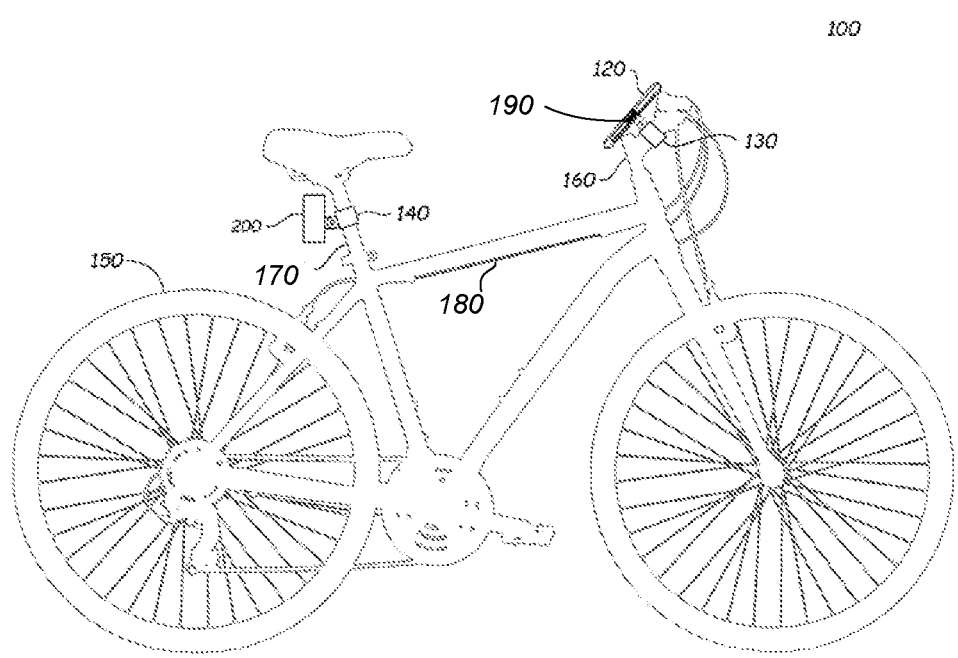
FIG. 1 is a side view of a bicycle showing where a main unit and an external device of a safety device may be mounted, in an embodiment.

FIG. 1 shows a configuration 100 of a safety device installed on a bicycle 150, shown in side view, to assist a bicycle rider (not shown). The bicycle 150 may be referred to herein as an operator vehicle, and the bicycle rider is an operator thereof. In an embodiment, main unit 200 is mounted via post clamp 140 to bicycle 150 seat post 170. In an alternate embodiment, main unit 200 may be mounted to bicycle 150 by other means or in other locations, such as crossbar 180. In an embodiment, external device 120 is mounted to stem 160 by stem clamp 130 to provide visual information and control functions to the rider and includes a communications link (not shown) for exchanging information and control signals with main unit 200. External device 120 may include a cell phone or tablet device held in place by a clamping mechanism 190.

Figure 2:
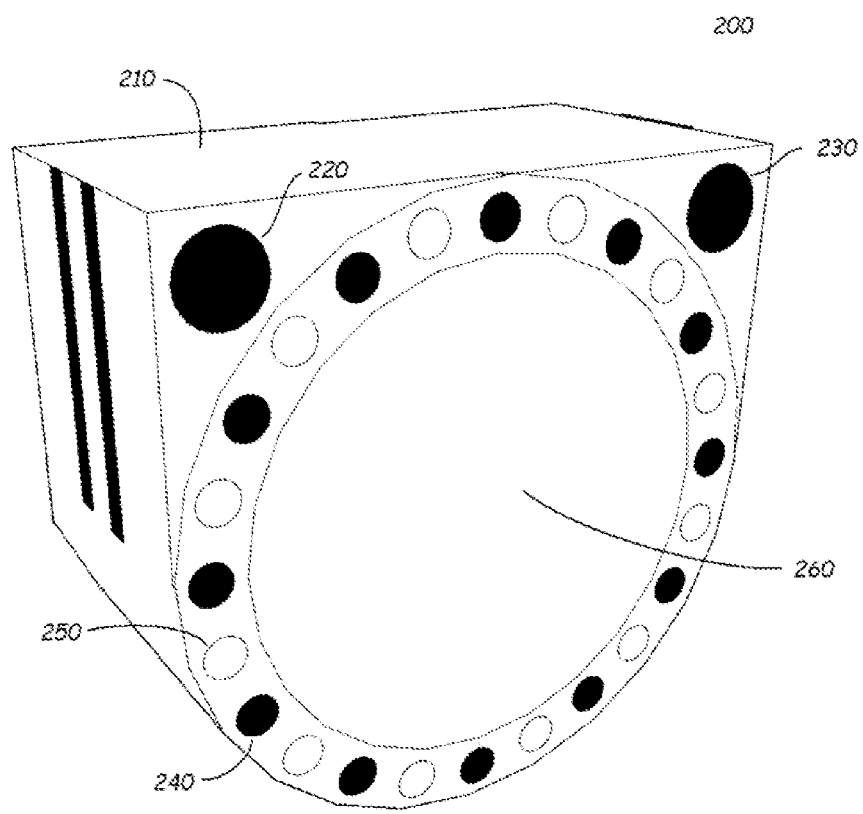
FIG. 2 is a perspective view of the main unit of FIG. 1, in an embodiment.

FIG. 2 is a perspective view of main unit 200. Main unit 200 includes a housing 210 which provides mounting for first camera 220 and second camera 230. In some embodiments, the housing 210 is sealed to provide water/weather resistance. In an embodiment, a plurality of alert devices including twelve running lights 240 and twelve alert lights 250 are arranged in a circle around horn 260 in an alternating fashion as shown. In alternative embodiments, any number of lights may be used and they may be installed in any convenient arrangement so as to provide adequate visibility. Main unit 200 is designed to point in a predetermined direction of interest. As such first camera 220 and second camera 230 are facing in the same direction to sense objects in the field of view centered in the predetermined direction of interest; running lights 240, alert lights 250 are intended to cast their light predominantly in the direction of interest; and horn 260 is intended to direct sound predominantly in the direction of interest. In the embodiment, the direction of interest is chosen to be rearward with respect to bicycle 150 to observe vehicles approaching from behind. In alternative embodiments of the present invention, the direction of interest may be chosen to point differently depending on the application or various other design choices. It is expected that due to proximity with horn 260, bicycle 150 rider would hear horn 260 sound even though horn 260 is arranged to send sound energy predominantly rearward or in the alternative direction of interest. In a further embodiment, an alert may be provided to bicycle 150 rider by a vibrating element (not shown) on seat post 170.

Thus, in embodiments, main unit 200 is used in a case where a vehicle of interest is approaching from behind on a collision course with bicycle 150 as determined by analysis of images from first camera 220 and second camera 230. When a potential collision is detected, alert lights 250 are activated as well as horn 260, if included. Furthermore, the main unit 200 may transmit, either wirelessly or via wired connection, a control signal to the external device 120 that, when received by the external device 120, causes the display device 120 to initiate an attention-getting visual cue on external device 120. As a consequence, the rider and the vehicle driver become aware of the impending collision and enact evasive maneuvers in order to avoid the collision.

Figure 3:
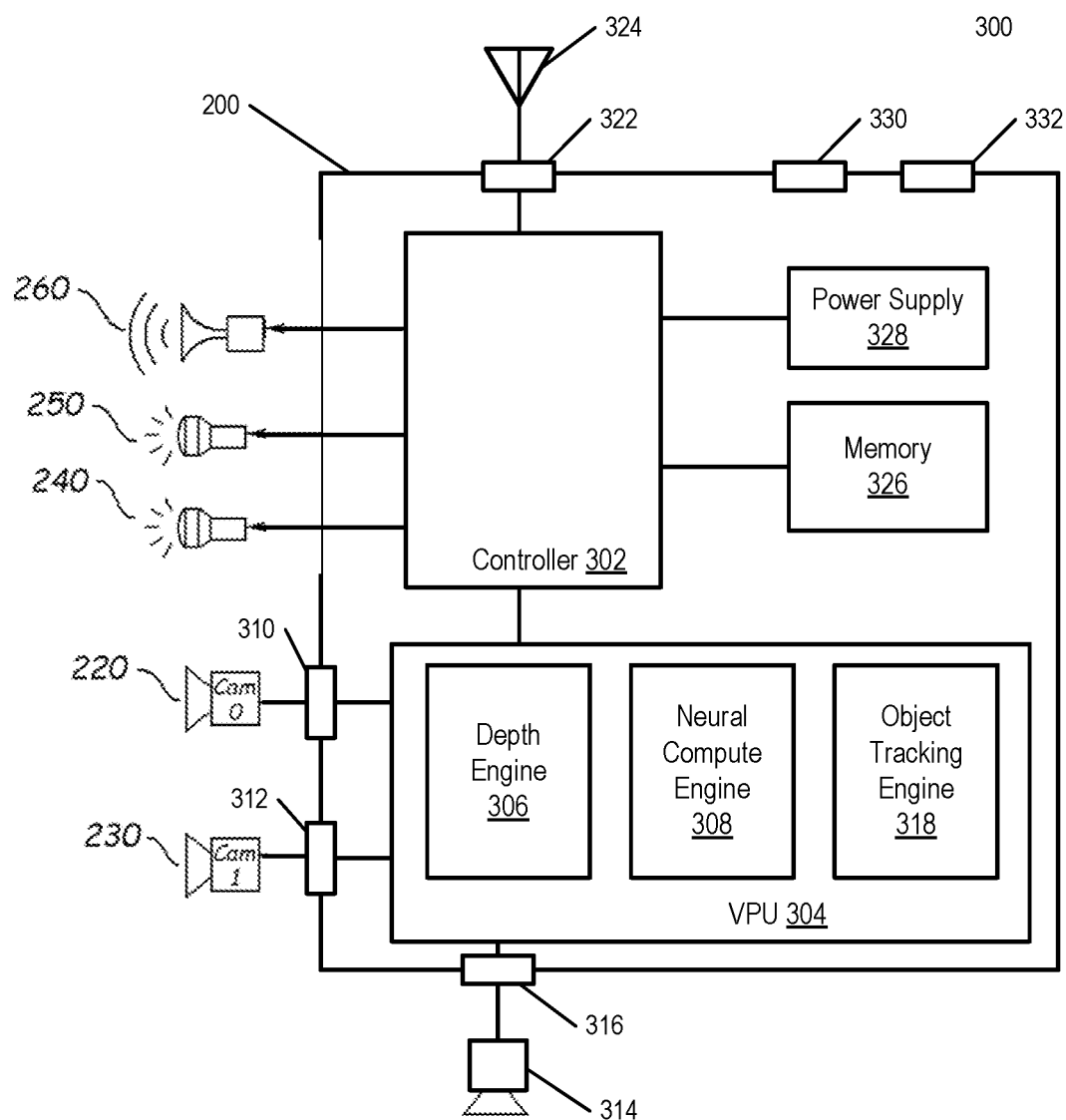
FIG. 3 is a block diagram illustrating various components in the main unit of FIG. 1, in an embodiment.

FIG. 3 is a block diagram 300 illustrating various components of the main unit 200. Main unit 200 includes processing components and memory components storing computer readable instructions that, when executed by processing components, cause the main unit to perform the operations described herein. For ease of description, several processing and memory components are shown and described. In embodiments, main unit 200 may be implemented by a single processor and memory, or any number of processors or memories. Various components may be combined or split as necessary to meet design requirements.

In an embodiment, main unit 200 as shown in FIG. 3 includes two processing components: controller 302 and video processing unit (VPU) 304. In embodiments, the controller 302 and VPU 304 may be incorporated in a single processor. In alternative embodiments, more processing components may be used. VPU 304 includes depth engine 306, neural compute engine 308 and object tracking engine 318. In an embodiment, VPU 304 is an Intel® Movidius™ Myriad™ X VPU (video processing unit) although any suitable disparity-depth and neural processing engine may be used. Depth engine 306 and neural compute engine 308 each represent computer readable instructions stored in memory that, when executed by processing components, cause the main unit 200 to implement the functionality discussed below.

To illustrate operation of main unit 200, details of a specific implementation including operational speed and frame rate using a Myriad™ X VPU are discussed herein, however, main unit 200 is not limited to this specific implementation. A Myriad™ X has the capability of processing video images at four trillion-operations-per-second. VPU 304 has several hardware and/or firmware capabilities for processing images, including depth engine 306 which enables depth perception, neural compute engine 308, which provides objection detection and localization, as well as tracking engine 318, which determines object tracking. Other capabilities which facilitate these processes may include motion estimation, edge detection, filtering and encoding. Depth engine 208 and neural compute engine 308 develop screen coordinate bounding box information for detected objects. Bounding box information allows object localization in an x, y, z coordinate system. Although VPU 304 is described as having three separate engines, this is for the purpose of describing the operation of main unit 200, any implementation may provide the capabilities described above in different ways.

Individual cameras may be able to provide raw image data at a minimum speed of 5 gigabits per second. Two cameras provide 10 gigabits per second. A USB connection to a VPU such as the Myriad X is only capable of a data rate of approximately 6 megabits per second. Providing image data to the Myriad X over a USB connection means the images can only be processed at the speed with which they are delivered to the VPU, not at the speed which they are acquired by the cameras.

As shown in FIG. 3, first camera 220 and second camera 230 provide shutter synchronized stereo images to VPU 304 through MIPI (Mobile Industry Processor Interface) ports 310 and 312. Use of the MIPI ports facilitates inputting raw data to VPU 304 from first camera 220 and second camera 230, which may provide 720p images at 120 fps (frames per second), although images having any resolution required for subsequent processing may be used.

Depth engine 306 computes RGB-D images from the stereo images provided by first camera 220 and second camera 230. An RGB-D image is an RGB (red-green-blue) image together with a corresponding depth image which incorporates depth information for each pixel in the image by comparing the relative position of features in each pair of images. The RGB-D images output by depth engine 306 are processed by convolutional neural networks in neural compute engine 308 to perform object detection and localization. VPU 304 may also receive input from camera 314 through port 316. In an embodiment, camera 314 may be a 60 Hz video color camera with digital zoom capabilities.

Object tracking engine 318 in VPU 304 processes bounding box information in an x, y, z coordinate system where the origin point (0, 0, 0) is main unit 200. This allows main unit to understand where it is in space, and determine with objects (vehicles) detected by depth engine 305 and neural computer engine 308 are on a trajectory to insect with the bicycle to which main unit 200 is attached. VPU 304 may also output depth video or images, color video or images or stereo pair video or images as necessary for a particular application. In an embodiment, the connection between controller 302 and VPU 304 may be a universal serial bus (USB).

Controller 302 stores information about rules for assessing collision risk. For example, one or more buffer zones may be defined, with escalating levels of warnings provided as vehicles are tracked towards the bicycle. A buffer zone may be programmed into main unit 200, or may be customizable by a rider based on a preferred level of risk. Buffer zones may be defined by thresholds which may be input by a rider and/or combined algorithmically. Thresholds may relate to factors such as speed, bike lane or shoulder width, terrain (for example, a mountainous region), or physical locations such as going around a turn, any of which may be rider-settable and based on an acceptable level of risk.

Controller 302 is also coupled to communication port 322 which provides an interface with antenna 324. In an embodiment, communication port 322 and antenna 324 comprise a link to external device 120 (FIG. 2). Via communication port 322, bicycle positional and situational information, images, and control may be shared between external device 120 and controller 302. Positional information may include, for example, one or more of GPS (Global Positioning System) information and accelerometer information generated at external device 120 (and thus representative of the bicycle 150 attached thereto) and transmitted to the main unit 200.

Controller 302 is also coupled to memory 326, which may be volatile or non-volatile. During operation, RGB-D data are stored in the memory 326 (such as in a circular buffer) by controller 302 for later access. In an embodiment, inertial measurements may be sensed in external device 120 and communicated via communication port 322 to controller 302 in real time. Inertial readings provide information about whether or not the bicycle is still moving and thus, may disable further recording of RGBD data to non-volatile memory 326 by controller 302 after a predetermined amount of time. Thus, non-volatile memory 326 may contain a record of the collision for later viewing and analysis.

Controller 302 is connected to and has control of running lights 240, alert lights 250, and horn 260 that may be used to alert an operator of an approaching vehicle if the possibility of collision is detected. It should be appreciated that the running lights 240 are visible to the operator of approaching vehicles, and that because the alert lights 250 and horn 260 are mounted in the predetermined direction of interest, they too are visible to the operator of an approaching vehicle. Power supply 328 provides power to components of main unit 200. In an embodiment, power supply 328 may be provided by a battery and/or a connection to a power source external to main unit 200. One or more ports 330 and 332 may be used to provide audio, Ethernet, USB or other connections to main unit 200 and its components.

Figure 4:
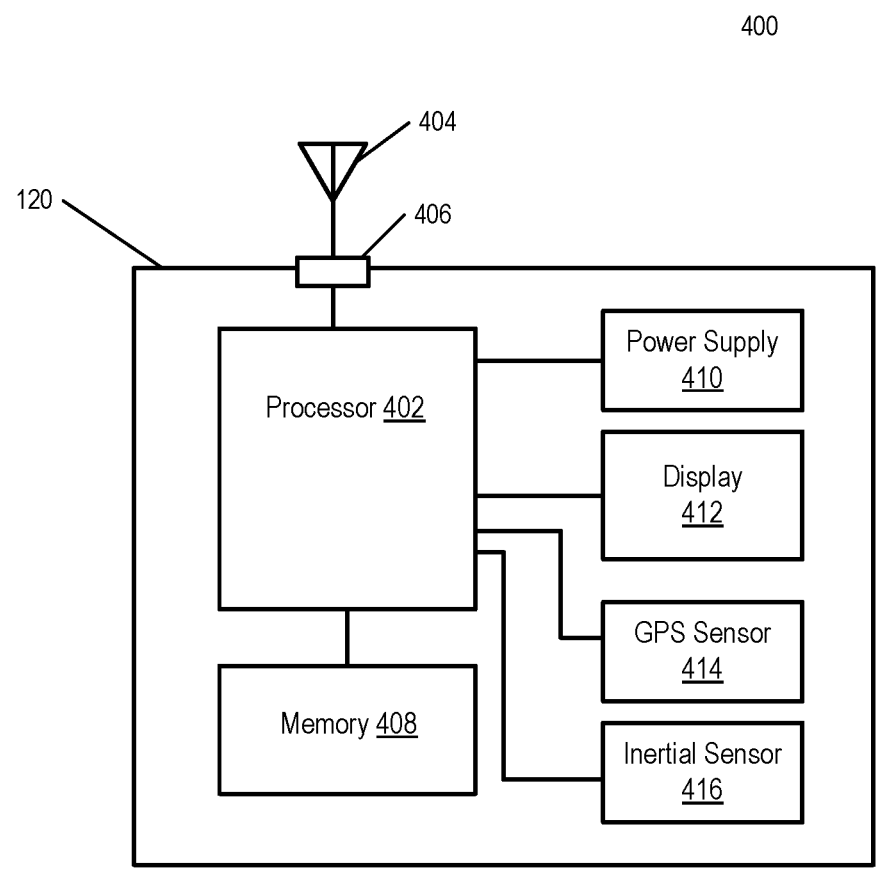
FIG. 4 is a block diagram illustrating various components of the external device of FIG. 1.

FIG. 4 is a block diagram 400 illustrating various components of the external device 120. In an embodiment, external device 120 is a cell phone or other mobile device including processor 402 and memory 408 storing computer readable instructions that, when executed by processor 402, cause the main unit to perform the operations described herein. Various components may be combined or split as necessary to meet design requirements. Processor 402 communicates with main unit 200 using antenna 404 and communication port 406. Processor 402 receives bicycle positional and situational information from GPS sensor 414 and inertial sensor 416 and sends it to main unit 200. Processor 402 also receives images and exchanges one or more control signals with main unit 200 by means of antenna 404 in communication with antenna 324 of main unit 200. In an embodiment, external device 120 includes a power supply 410 and a display 412 for display images or video received from main unit 200 over antenna 404. External device 120 may also include other components not shown for clarity, including audio input/output, for example.

In an embodiment, antenna 404 may also allow a crowdsourcing application executed on external device 120 to be in communication with a server hosting mapping software, for example. Events detected by main unit 200 or external device 120 such as identification of near misses, activation of alert devices and evasive actions by the rider may be collected in the crowdsourcing application and uploaded to the server. This information would then be available for other riders to download into the crowdsourcing application on their external device based on their GPS information. The information could include, for example, safe bicycle routes, blind curves, even dangerous conditions in real time. The crowdsourcing application may also provide an option for advice from the bicycling community on bike commuting, such as identifying roads where riders have experiences a high percentage of near misses.

Figure 5:
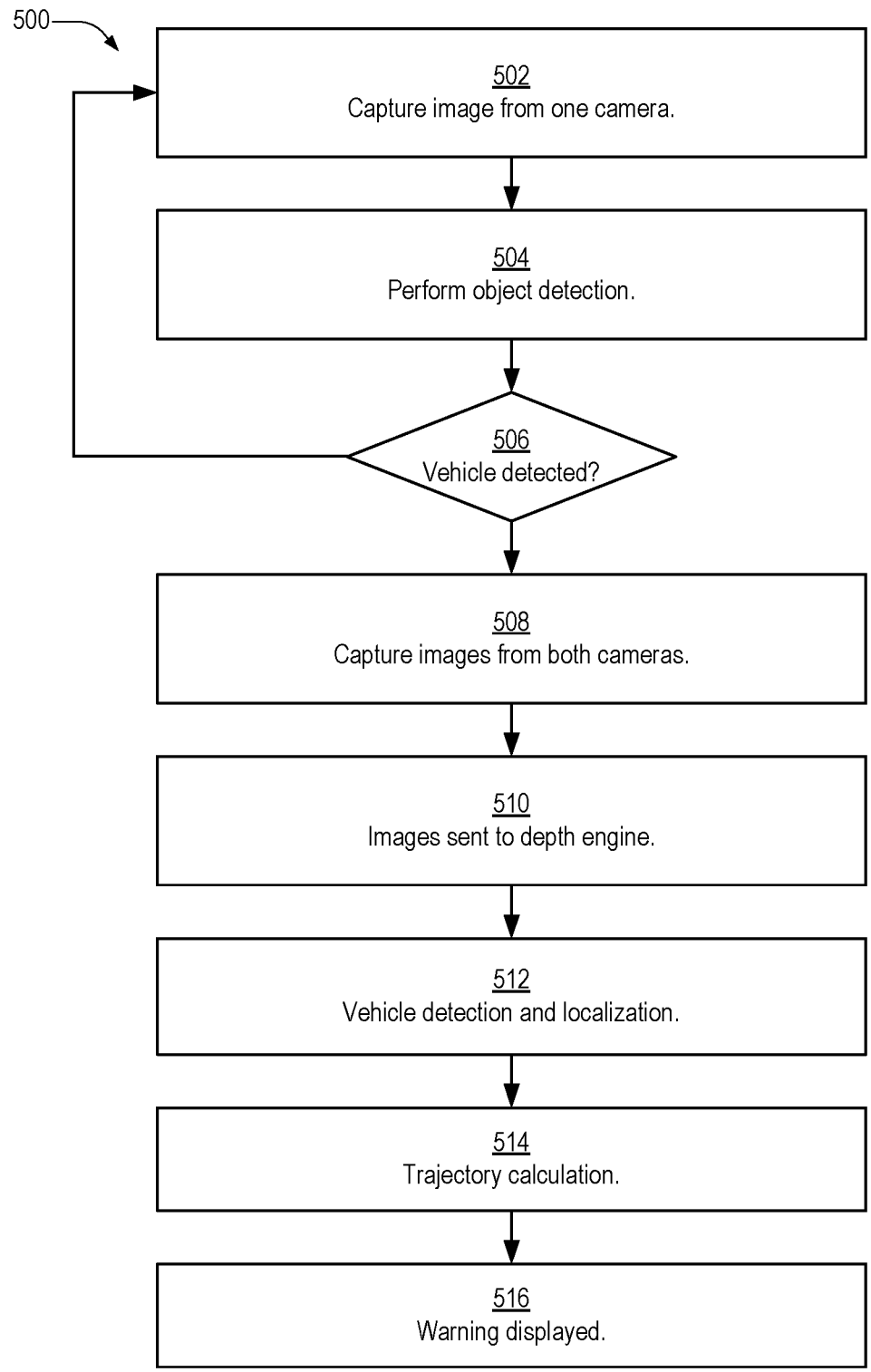
FIG. 5 is flowchart illustrating the processing flow of the collision detection algorithm, in an embodiment.

FIG. 5 is a flowchart illustrating of the processing flow 500 of a collision detection algorithm. In step 502, images are captured. In an embodiment, only one of first camera 220 or second camera 230 is used during initial start-up and conditions when no vehicle is detected. This reduces battery usage by main unit 200. To further reduce battery use, images are captured and processes at 30 fps. In step 504, object detection is performed. In an embodiment, images captured in step 502 are processed to determine if any vehicles are located in the image. In step 506, if no vehicles are detected, the processing flow returns to step 502.

Upon detection of one or more vehicles, processing flow moves to step 508, where images captured by two cameras. In an embodiment, first camera 220 and second camera 230 capture shutter synchronized stereo images in a video stream of 120 fps. In step 510, captured images are sent to VPU 304 and depth engine 306. In an embodiment, depth engine 306 process captured images to determine RGB-D images. The physical separation of first camera 220 and second camera 230 provide slightly different viewing angles that allow depth engine 306 to compute a per-pixel distance for the RGB-D images.

In step 512, vehicle detection and localization is performed. In an embodiment, image data from depth engine 306 is provided to neural compute engine 308 which uses class definitions to identify vehicles of a class that poses a potential collision threat such as car, truck, motorcycle, etc. In an embodiment, neural compute engine 308 provides an output that includes per-pixel RGB-D data and also a list of detected vehicle classifications and bounding boxes. In an alternative embodiment, neural compute engine 308 may provide a vehicle pixel mask rather than a bounding box for each detected vehicle.

In step 514, objects that are detected to be of a class that poses a potential collision threat are tracked at a high frame rate by object tracking engine 318. Object tracking engine 318 is seeded by bounding boxes determined from neural compute engine 308 on a periodic basis, even though such seeds from neural compute engine 308 may be available at a lower frame rate that is output from collision tracking engine 320. A trajectory of a vehicle being tracked is estimated. In an embodiment, trajectory estimation combines per-pixel depth information with high-frame-rate bounding box information to compute a trajectory in a screen-referenced coordinate system where main unit 200 is defined to be located at the origin. Thus, trajectory estimation determines whether the tracked object is on a course to pass through the origin of the coordinate system. Further, trajectory estimator 430 has sufficient information to estimate the expected time delay of the future collision. This estimate is constantly updated at each high-rate frame to provide a real-time collision estimate.

In step 516, warnings are provided when a potential future collision is determined. In an embodiment, as the estimated collision time delay becomes smaller and smaller, controller 308 steps through a series of escalating warning messages. Messages may include, for example, a textual message on the external device 120 such as "Vehicle Approaching", or "Warning", or "Alert" as discussed below with reference to FIG. 6. Further escalations on display 120 may include but are not limited to changing the display background color to red, or momentarily or periodically providing a full intensity white screen image or "flash" to get the rider's attention. Warning messages also include causing the running lights 240 and/or alert lights 250 to flash or shine brightly, and may also encompass sounding horn 260. Alternative embodiments encompass various patterns of lights 240, 250 flashing and horn 260 sounding to maximally get the attention of the rider and/or vehicle driver.

Figure 6:
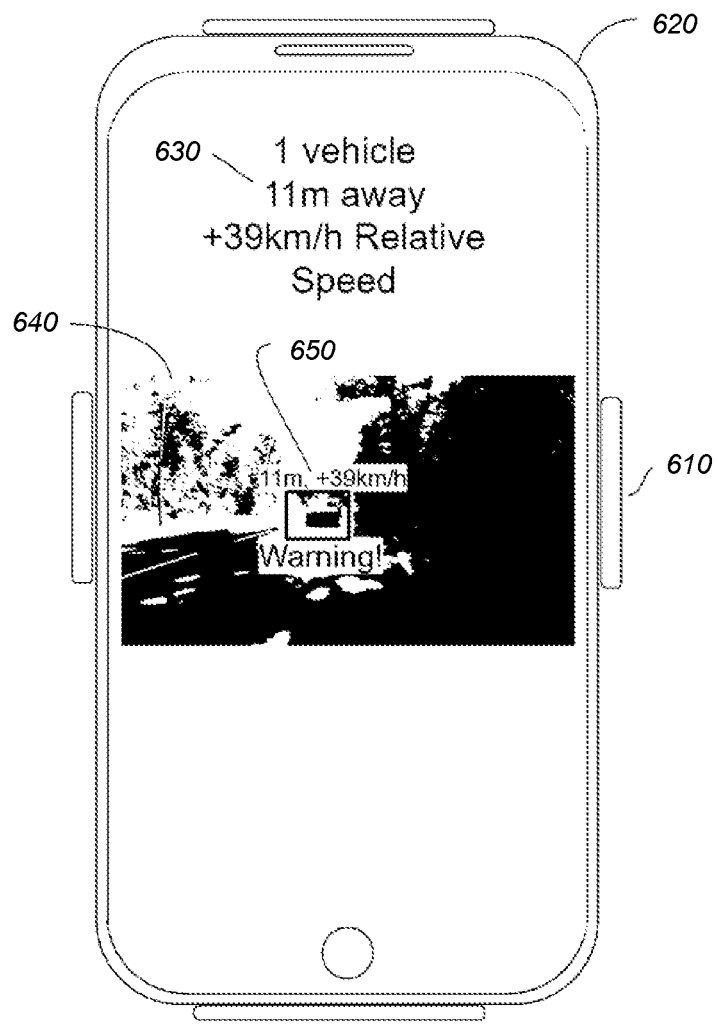
FIG. 6 is a front view of the external device showing a representation of the user display screen, in an embodiment.

FIG. 6 is a front view of the external device 120 showing a representation of the user display screen. External device 120 may be, for example, a cell phone 620 affixed to bicycle 150 (FIG. 1) by clamp system 610. Cell phone 620 may execute a custom application that is in communication with main unit 200 and displays information for the benefit of the rider of bicycle 150.

The display on cell phone 620 is made to display images 640 as seen by first camera 220 and second camera 230 and/or camera 314. As vehicles are detected that have the potential colliding with bicycle 150, the display is annotated with relevant situational information. For example, if a vehicle is on a collision course, but the collision time delay is many seconds, a warning message may be displayed on cell phone 620 showing an annotated bounding box 650 with the message "warning" and a general display message 630 of "1 vehicle 11 m away+39 km/h relative speed."

Combinations of Features

Features described above as well as those claimed below may be combined in various ways without departing from the scope hereof. The following enumerated examples illustrate some possible, non-limiting combinations:

(A1) An apparatus for detecting vehicles around a bicycle operated by a rider includes a plurality of cameras for capturing a series of images of a field of view pointed in a direction of interest with respect to the bicycle, the plurality of cameras mounted in a housing attached to the bicycle; at least one alert device pointed in the direction of interest; at least one processor; and memory storing computer readable instructions that, when executed by the processor, cause the apparatus to: determine a depth image from successive pairs of images in the series of images received from the plurality of cameras; identify one or more vehicles in the depth image; if a vehicle is identified, determine a trajectory of the vehicle based at least on a depth of the vehicles over a plurality of the series of images, determine if the trajectory of the vehicle will result in a collision with the bicycle; and if the trajectory will result in a collision between the bicycle and the identified vehicle, generate a control signal to activate the at least one alert device.

(A2) In apparatus (A1) the at least one alert device includes one or more of at least one light and a horn.

(A3) In apparatus (A1) or (A2), a communication port for receiving positional information from an external device coupled to the bicycle and for sending at least one of the series of images to the external device for display to the rider on a display of the external device.

(A4) In apparatus (A3), the positional information includes at least one of GPS information or accelerometer information.

(A5) In apparatus (A3), the external device is wirelessly coupled to the apparatus.

(A6) In any of (A1)-(A5), the direction of interest comprises a rearward direction of the bicycle.

(A7) In any of (A1)-(A6), the memory further storing computer readable instructions, that when executed by the processor, further cause the apparatus to identify a bounding box around the vehicle; and wherein the computer readable instructions that determine the trajectory of the vehicle further, when executed by the at least one processor, determine the trajectory of the vehicle based on the bounding box of the vehicle over the series of images.

(B1) A method of detecting vehicles around a bicycle operated by a rider, the xmethod performed by a processor executing computer readable instructions, including capturing a series of images of a field of view pointed in a direction of interest with respect to the bicycle using a plurality of cameras mounted in a housing attached to the bicycle; determining a depth image from successive pairs of images in the series of images received from the plurality of cameras; identifying a vehicle in the depth image; if a vehicle is identified, determine a trajectory of the vehicle based at least on a depth of the vehicles over a plurality of the series of images; determining if the trajectory of the vehicle will result in a collision with the bicycle; and if the trajectory will result in a collision, generating a control signal to activate at least one alert device.

(B2) In method (B1), identifying a vehicle includes identifying a bounding box around at least one vehicle.

(B3) In method (B2), determining a trajectory includes determining the trajectory of the vehicle based on the bounding box of the vehicle over the series of images.

(B4) In any of methods (B1)-(B3), determining a depth includes determining an RGB-D image from a pair of images captured by the plurality of cameras at a moment in time.

(B5) In any of methods (B1)-(B4), determining if the trajectory of the vehicle will result in a collision includes defining a buffer zone around the bicycle; and determining whether the vehicle will enter the buffer zone.

(B6) In any of methods (B1)-(B5), the direction of interest may be a rearward direction of the bicycle.

(B7) In any of methods (B1)-(B6), the method includes receiving positional information comprising at least one of GPS information or accelerometer information from an external device coupled to the bicycle.

(B8) The method of (B7), including displaying the series of images on a display of the external device.

(B9) The method of (B8), including displaying a warning message on the display in response to the control signal.

(B10) The method of (B7), including uploading an event information associated with generating of the control signal to a server; and downloading event information from the server based on GPS information of the external device.

(B11) In any of methods (B1)-(B10), if a vehicle is not identified, capturing a series of images using one of the plurality of cameras; identifying a vehicle in an image in the series of images; and capturing a series of images using the plurality of cameras.

The embodiments of the invention described herein are exemplary and numerous modifications, variations and rearrangements can be readily envisioned to achieve substantially equivalent results, all of which are intended to be embraced within the spirit and scope of the invention as defined in the appended claims.

The invention claimed is:

1. An apparatus for detecting vehicles around a bicycle operated by a rider, comprising:
   a plurality of cameras for capturing a series of images of a field of view pointed in a direction of interest with respect to the bicycle, the plurality of cameras mounted in a housing attached to the bicycle;
   at least one alert device pointed in the direction of interest;

at least one processor; and memory storing computer readable instructions that, when executed by the processor, cause the apparatus to:
- determine a depth image from successive pairs of images in the series of images received from the plurality of cameras;
- identify one or more vehicles in the depth image;
- if a vehicle is identified, determine a trajectory of the vehicle based at least on a depth of the vehicles over a plurality of the series of images,
- determine if the trajectory of the vehicle will result in a collision with the bicycle; and
- if the trajectory will result in a collision between the bicycle and the identified vehicle, generate a control signal to activate the at least one alert device.

2. The apparatus of claim 1, wherein the at least one alert device further comprises one or more of at least one light and a horn.

3. The apparatus of claim 1, further comprising:
a communication port for receiving positional information from an external device coupled to the bicycle and for sending at least one of the series of images to the external device for display to the rider on a display of the external device.

4. The apparatus of claim 3, wherein the positional information further comprises at least one of GPS information or accelerometer information.

5. The apparatus of claim 3, wherein the external device is wirelessly coupled to the apparatus.

6. The apparatus of claim 1, wherein the direction of interest comprises a rearward direction of the bicycle.

7. The apparatus of claim 1, the memory further storing computer readable instructions, that when executed by the processor, further cause the apparatus to:
- identify a bounding box around the vehicle; and
- wherein the computer readable instructions that determine the trajectory of the vehicle further, when executed by the at least one processor, determine the trajectory of the vehicle based on the bounding box of the vehicle over the series of images.

8. A method of detecting vehicles around a bicycle operated by a rider, the method performed by a processor executing computer readable instructions, comprising:
- capturing a series of images of a field of view pointed in a direction of interest with respect to the bicycle using a plurality of cameras mounted in a housing attached to the bicycle;
- determining a depth image from successive pairs of images in the series of images received from the plurality of cameras;
- identifying a vehicle in the depth image;
- if a vehicle is identified, determine a trajectory of the vehicle based at least on a depth of the vehicles over a plurality of the series of images;
- determining if the trajectory of the vehicle will result in a collision with the bicycle; and
- if the trajectory will result in a collision, generating a control signal to activate at least one alert device.

9. The method of claim 8, wherein identifying a vehicle further comprises identifying a bounding box around at least one vehicle.

10. The method of claim 9, wherein determining a trajectory further comprises determining the trajectory of the vehicle based on the bounding box of the vehicle over the series of images.

11. The method of claim 8, wherein determining a depth further comprises determining an RGB-D image from a pair of images captured by the plurality of cameras at a moment in time.

12. The method of claim 8, wherein determining if the trajectory of the vehicle will result in a collision further comprises:
- defining a buffer zone around the bicycle; and
- determining whether the vehicle will enter the buffer zone.

13. The method of claim 8, wherein the direction of interest comprises a rearward direction of the bicycle.

14. The method of claim 8, further comprising receiving positional information comprising at least one of GPS information or accelerometer information from an external device coupled to the bicycle.

15. The method of claim 14, further comprising displaying the series of images on a display of the external device.

16. The method of claim 15, further comprising displaying a warning message on the display in response to the control signal.

17. The method of claim 14, further comprising:
- uploading an event information associated with generating of the control signal to a server; and
- downloading event information from the server based on GPS information of the external device.

18. The method of claim 8, further comprising:
- if a vehicle is not identified, capturing a series of images using one of the plurality of cameras;
- identifying a vehicle in an image in the series of images; and
- capturing a series of images using the plurality of cameras.

* * * * *